US008611100B2

(12) United States Patent
Kuo et al.

(10) Patent No.: US 8,611,100 B2
(45) Date of Patent: Dec. 17, 2013

(54) DISPLAY DEVICE BACK PANEL WITH ADJUSTABLE PCB MOUNTING SEAT

(75) Inventors: Yicheng Kuo, Guangdong (CN); Yuchun Hsiao, Guangdong (CN); Chong Huang, Guangdong (CN); Jiahe Cheng, Guangdong (CN); Chengwen Que, Guangdong (CN); Quan Li, Guangdong (CN); Liuyang Yang, Guangdong (CN)

(73) Assignee: Shenzhen China Star Optoelectronics Technology Co., Ltd., Shenzhen, Guangdong Province (CN)

( * ) Notice: Subject to any disclaimer, the term of this patent is extended or adjusted under 35 U.S.C. 154(b) by 168 days.

(21) Appl. No.: 13/381,934

(22) PCT Filed: Nov. 24, 2011

(86) PCT No.: PCT/CN2011/082905
§ 371 (c)(1),
(2), (4) Date: Dec. 31, 2011

(87) PCT Pub. No.: WO2013/071638
PCT Pub. Date: May 23, 2013

(65) Prior Publication Data
US 2013/0128471 A1 May 23, 2013

(51) Int. Cl.
*H05K 5/00* (2006.01)
(52) U.S. Cl.
USPC ........... 361/759; 361/752; 361/753; 361/810; 361/825; 174/138 E; 174/138 G
(58) Field of Classification Search
USPC ......... 361/752, 753, 754, 759, 808, 807, 810, 361/809, 825; 174/138 E, 138 G, 563, 560, 174/561
See application file for complete search history.

(56) References Cited

U.S. PATENT DOCUMENTS

| 5,398,156 | A | * | 3/1995 | Steffes et al. | 361/679.58 |
|---|---|---|---|---|---|
| 6,166,916 | A | * | 12/2000 | Jelinger | 361/756 |
| 6,754,085 | B2 | * | 6/2004 | Kalkbrenner | 361/752 |
| 6,865,091 | B2 | * | 3/2005 | Hsu | 361/801 |
| 7,515,403 | B2 | * | 4/2009 | Hong | 361/679.22 |
| 7,839,658 | B2 | * | 11/2010 | Kim | 361/807 |
| 8,116,087 | B2 | * | 2/2012 | Lo | 361/759 |
| 2008/0304244 | A1 | * | 12/2008 | Hsieh | 361/810 |
| 2011/0032682 | A1 | * | 2/2011 | Hsu | 361/759 |

* cited by examiner

*Primary Examiner* — Jinhee Lee
*Assistant Examiner* — Christopher L Augustin
(74) *Attorney, Agent, or Firm* — Cheng-Ju Chiang

(57) ABSTRACT

The present invention provides a display device back panel with adjustable PCB mounting seat, which includes a hollow body and paired mounting seats. The mounting seats are arranged in a hollow portion of the body and have opposite ends extended to connect to the body. Each of the mounting seats includes a first bracket and a second bracket that are symmetrically arranged and a connection board connected between the first bracket and the second bracket. The first bracket has an end adjustably connected to the body and an opposite end adjustably connected to the connection board. The second bracket has an end adjustably connected to the body and an opposite end adjustably connected to the connection board. The first bracket has a first bent section that is bent downward, and the second bracket has a second bent section that is bent down. The pair of mounting seats forms a receiving space between the two first bent sections and the two second bent sections that receive a PCB supported and mounted thereon. The assembling is simple and through the adjustable connection formed between the first bracket, the second bracket, the body, and the connection board, it is suitable for mounting and fixing PCBs of various sizes.

4 Claims, 2 Drawing Sheets

DISPLAY DEVICE BACK PANEL WITH ADJUSTABLE PCB MOUNTING SEAT

BACKGROUND OF THE INVENTION

1. Field of the Invention

The present invention relates to the technical field of display device, and in particular to a display device back panel with an adjustable PCB (Printed Circuit Board) mounting seat.

2. The Related Arts

A liquid crystal display is commonly abbreviated as LCD, and the operation principle is placing liquid crystal molecules between two parallel pieces of glass. A plurality of tiny vertical and horizontal conductive wires is arranged between the pieces of glass and change of direction of the liquid crystal molecules is controlled through application of electricity so as to refract light outwards to form an image. The liquid crystal display is now widely used due to various advantages of being compact in size, saving of power, and being free of radiations. A backlight module is an important component of the liquid crystal display and a known backlight module generally comprises an optic film, a light guide plate, a backlight unit, and a back panel. To meet the requirements of large-sized liquid crystal display devices, the known back panel is generally a unitary back panel that is integrally formed by means of metal stamping or plastic injection molding and the back panel is provided with bumps for mounting a PCB. However, the unitary back panel increases the weight of the display device, needs more material for production, and may cause a higher cost.

To overcome the above problems, a hollow or joined back panel is available in the market. Chinese Patent No. CN201672468 discloses a structure of rear-side back panel for backlight module, which uses a plurality of mounting strips joined together to form the rear-side back panel with the mounting strips intersecting each other. An outer frame of the back panel is provided with a plurality of horizontal mounting strips riveted therein and having threaded holes. With the engagement of the threaded hole with bolts, A PCB is mounted on the plurality of horizontal mounting strips. However, mounting a PCB with a horizontal mounting strips is disadvantageous in that the mounting process is complicated and adjustment can impossibly done and also, it is not suitable for mounting PCBs of different sizes, making the applicability thereof very poor.

SUMMARY OF THE INVENTION

An objective of the present invention is to provide a display device back panel with adjustable PCB mounting seat, which overcomes the problem that a PCB is hard to securely fixed in a hollow or joined back panel, allows of saving cost of mold through a shareable design of mounting seat, is suitable for securely fixing PCBs of variable sizes through adjustable connection between first and second brackets and back panel body and connection board, and is easy to assemble.

The present invention provides a display device back panel with adjustable PCB mounting seat, which comprises: a hollow body and paired mounting seats. The mounting seats are arranged in a hollow portion of the body and have opposite ends extended to connect to the body. Each of the mounting seats comprises a first bracket and a second bracket that are symmetrically arranged and a connection board connected between the first bracket and the second bracket. The first bracket has an end adjustably connected to the body and an opposite end adjustably connected to the connection board. The second bracket has an end adjustably connected to the body and an opposite end adjustably connected to the connection board. The first bracket has a first bent section that is bent downward, and the second bracket has a second bent section that is bent down. The pair of mounting seats forms a receiving space between the two first bent sections and the two second bent sections that receive a PCB supported and mounted thereon.

The connection board forms a first adjustment hole corresponding to the first bracket and the second bracket. The first bracket has an end forming a first through hole corresponding to the first adjustment hole, and the second bracket has an end forming a second through hole corresponding to the first adjustment hole. A first bolt extends through the first through hole and cooperates with the first adjustment hole to allow the first bracket and the connection board to be connected in such a way as being adjustable in a direction of the first adjustment hole. A second bolt extends through the second through hole and cooperates with the first adjustment hole to allow the second bracket and the connection board to be connected in such a way as being adjustable in the direction of the first adjustment hole.

The body forms a first slide channel and a second slide channel respectively corresponding to the first bracket and the second bracket. The first slide channel and the second slide channel respectively form a second adjustment hole and a third adjustment hole. The first bracket has an end forming a third through hole corresponding to the second adjustment hole. The second bracket has an end forming a fourth through hole corresponding to the third adjustment hole. A third bolt extends through the third through hole and cooperates with the second adjustment hole to allow the first bracket and the body to be connected in an adjustable manner in a direction of the second adjustment hole. A fourth bolt extends through the fourth through hole and cooperates with the third adjustment hole to allow the second bracket and the body to be connected in such a way as being adjustable in a direction of the third adjustment hole.

The first bent section comprises a first positioning section that is vertically bent downwards, a bearing section that is perpendicular to an end of the first positioning section that is distant from the first bracket, and a first pawl section that is arranged at one side above the first bearing section and is inclined with respect to the first positioning section. The second bent section comprises a second positioning section that is vertically bent downwards, a second bearing section that is perpendicular to an end of the second positioning section that is distant from the second bracket, and a second pawl section that is arranged at one side above the second bearing section and is inclined with respect to the second positioning section. To mount a PCB, the PCB is positioned on the two first bearing sections and the two second bearing sections and ends of the two first pawl sections and ends of the two second pawl sections being respectively in engagement with a surface of the PCB that is away from the first bearing sections and the second bearing sections.

A protection lid is further included to cover above the receiving space of the pair of mounting seats.

The protection lid comprises a Mylar sheet.

The efficacy of the present invention is that the present invention provides a display device back panel with adjustable PCB mounting seat, which overcomes the problem that a PCB is hard to securely fixed in a hollow or joined back panel, allows of saving cost of mold through a shareable design of mounting seat, is suitable or securely fixing PCBs of various sizes through adjustable connection between first and second brackets and back panel body and connection board, and is easy to assemble.

For better understanding of the features and technical contents of the present invention, reference will be made to the following detailed description of the present invention and the attached drawings. However, the drawings are provided for the purposes of reference and illustration and are not intended to impose undue limitations to the present invention.

BRIEF DESCRIPTION OF THE DRAWINGS

The technical solution, as well as beneficial advantages, will be apparent from the following detailed description of an embodiment of the present invention, with reference to the attached drawings. In the drawings.

DETAILED DESCRIPTION OF THE PREFERRED EMBODIMENTS

To further expound the technical solution adopted in the present invention and the advantages thereof, a detailed description will be given to a preferred embodiment of the present invention and the drawings thereof.

Figure 1:
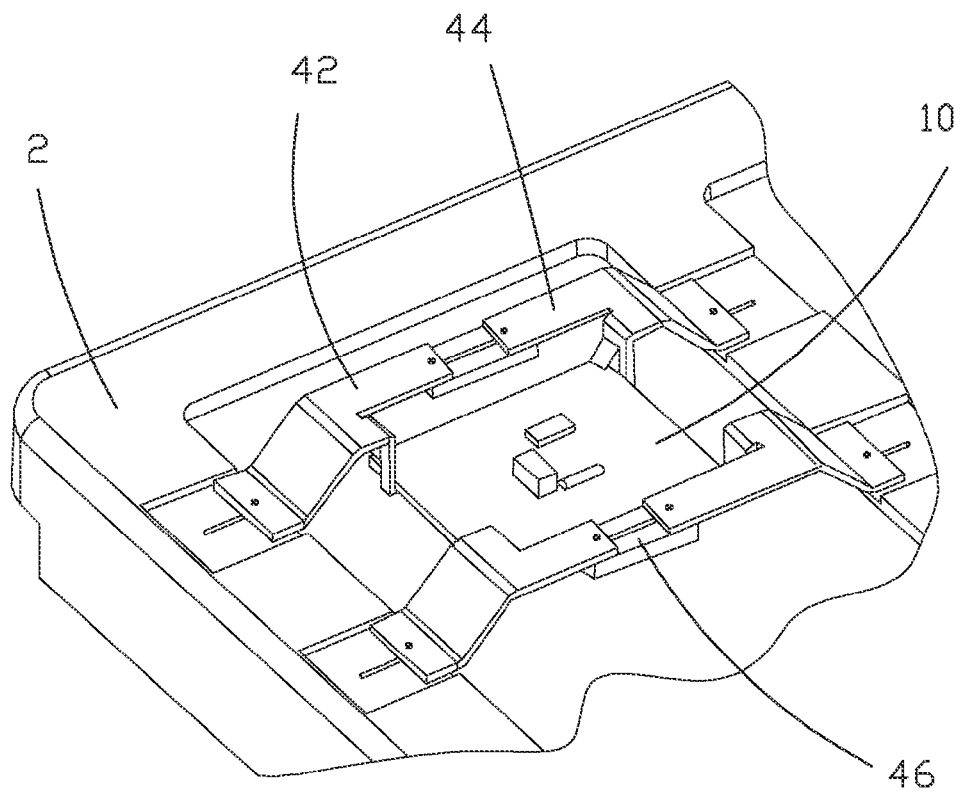
FIG. 1 is a partial perspective view of a display device back panel with adjustable PCB mounting seat according to the present invention.
Figure 2:
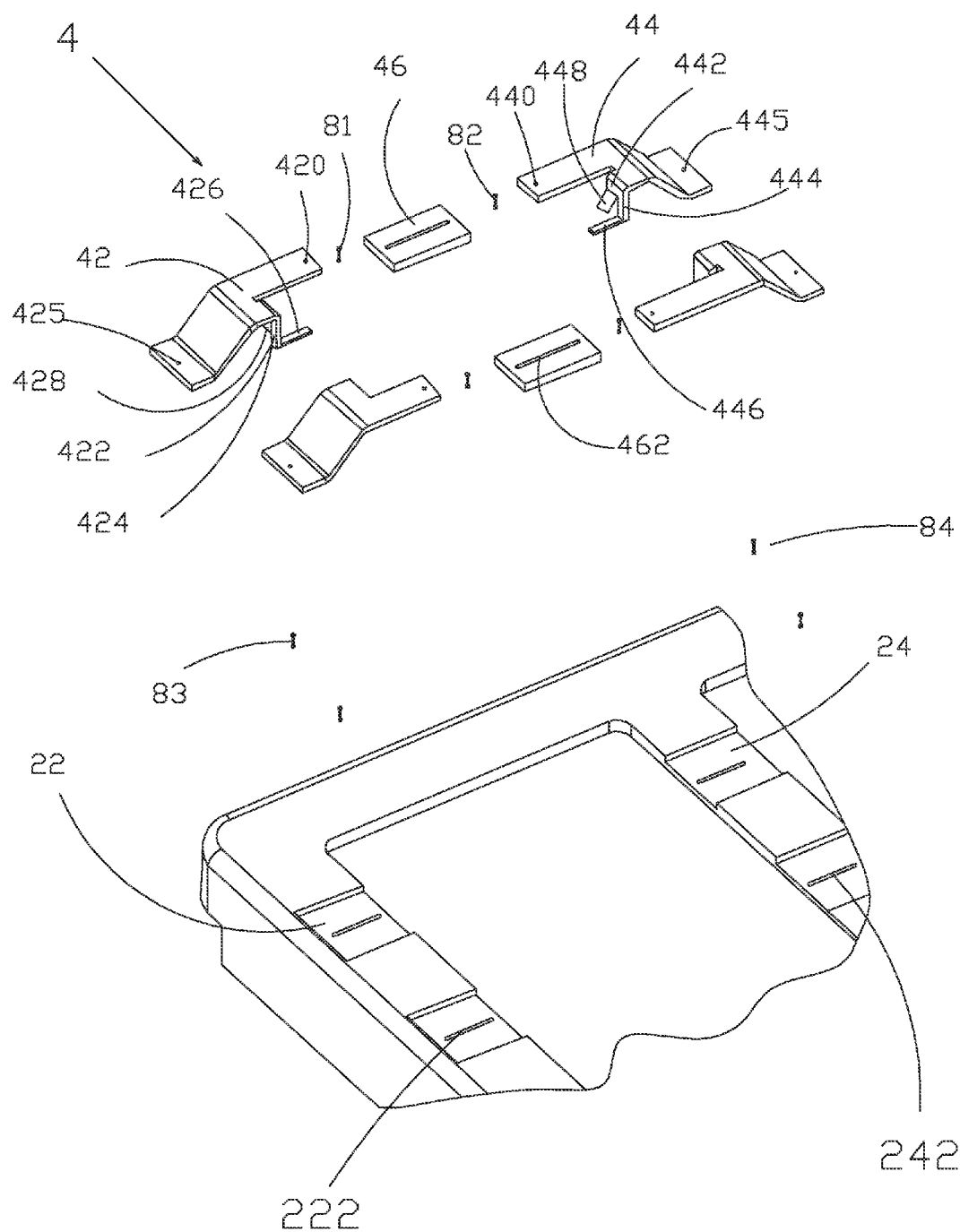
FIG. 2 is an exploded view of FIG. 1.

Referring to FIGS. 1 and 2, the present invention provides a display device back panel with adjustable PCB mounting seat, which comprises: a hollow body 2 and paired mounting seats 4. The mounting seats 4 are arranged in a hollow portion of the body 2 and have opposite ends that are extended to connect to the body 2. A PCB 10 is mounted on the mounting seats 4.

Each of the mounting seats 4 comprises a first bracket 42 and a second bracket 44 that are symmetrically arranged and a connection board 46 connected between the first bracket 42 and the second bracket 44.

The connection board 46 forms a first adjustment hole 462 corresponding to the first bracket 42 and the second bracket 44. The first bracket 42 has an end forming a first through hole 420, and the second bracket 44 has an end forming a second through hole 440. A first bolt 81 extends through the first through hole 420 to cooperate with the first adjustment hole 462 in order to allow the first bracket 42 and the connection board 46 to be connected in such a way as being adjustable in the direction of the first adjustment hole 462; the second bolt 82 extends through the second through hole 440 to cooperate with the first adjustment hole 462 in order to allow the second bracket 44 and the connection board 46 to be connected in such a way as being adjustable in the direction of the first adjustment hole, whereby the spacing of the first bracket 42 and the second bracket 44 with respect to the connection board 46 is adjustable.

The adjustment holes 462 can each alternatively be a plurality of circular holes arranged in a line.

The body 2 forms a first slide channel 22 corresponding to the first bracket 42 and a second adjustment hole 222 is formed in the first slide channel 22. The first bracket 42 has an end that is distant from the first through hole 420 and is provided with a third through hole 425. A third bolt 83 extends through the third through hole 425 to cooperate with the second adjustment hole 222 in order to allow the first bracket 42 and the body 2 to be connected in such a way as being adjustable in the direction of the second adjustment hole 222. The body 2 forms a second slide channel 24 corresponding to the second bracket 44 and a third adjustment hole 242 is formed in the second slide channel 24. The second bracket 44 has an opposite end that forms a fourth through hole 445. A fourth bolt 84 extends through the fourth through hole 426 to cooperate with the third adjustment hole 242 in order to allow the second bracket 44 and the body 2 to be connected in such a way as being adjustable in the direction of the third adjustment hole. Thus, the spacing of the first bracket 42 and the second bracket 44 with respect to the body 2 is adjustable.

The second adjustment hole 222 and the third adjustment hole 242 may each alternatively be a plurality of circular holes arranged in a line.

The first bracket 42 has a first bent section 422 that is bent downward and the second bracket 44 has a second bent section 442 that is bent downward. The first bent section 422 comprises a first positioning section 424 that is vertically bent downwards, a bearing section 426 that is perpendicular to an end of the first positioning section 424 that is distant from the first bracket 42, and a first pawl section 428 that is arranged at one side above the first bearing section 426 and is inclined with respect to the first positioning section 424. The second bent section 442 comprises a second positioning section 444 that is vertically bent downwards, a second bearing section 446 that is perpendicular to an end of the second positioning section 444 that is distant from the second bracket 44, and a second pawl section 448 that is arranged at one side above the second bearing section 446 and is inclined with respect to the second positioning section 444. To mount the PCB 10, the PCB 10 is positioned on the two first bearing sections 426 and the two second bearing sections 446 and the ends of the two first pawl sections 428 and the ends of the two second pawl sections 448 are respectively set in engagement with a surface of the PCB 10 that is away from the first bearing sections 426 and the second bearing sections 446. The mounting is easy and the mounting is secure. Through the adjustments that are made between the first bracket 42, the second bracket 44, the connection board 46, and the body 2, it is possible to realize fast mounting and positioning of PCBs of various sizes.

The display device back panel with adjustable PCB mounting seats according to the present invention further comprises a protection lid (not shown) covering above the receiving space of each pair of mounting seats, and the protection lid can be Mylar sheet.

In summary, the present invention provides a display device back panel with adjustable PCB mounting seat, which overcomes the problem that a PCB is hard to securely fixed in a hollow or joined back panel, allows of saving cost of mold through a shareable design of mounting seat, is suitable or securely fixing PCBs of various sizes through adjustable connection between first and second brackets and back panel body and connection board, and is easy to assemble.

Based on the description given above, those having ordinary skills of the art may easily contemplate various changes and modifications of the technical solution and technical ideas of the present invention and all these changes and modifications are considered within the protection scope of right for the present invention.

What is claimed is:

1. A display device back panel with an adjustable PCB (Printed Circuit Board) mounting seat, comprising:
a hollow body and paired mounting seats, the mounting seats being arranged in a hollow portion of the body and having opposite ends extended to connect to the body, each of the mounting seats comprising a first bracket and a second bracket that are symmetrically arranged and a connection board connected between the first bracket and the second bracket, the first bracket having an end adjustably connected to the body and an opposite end adjustably connected to the connection board, the second bracket having an end adjustably connected to the body and an opposite end adjustably connected to the connection board, the first bracket having a first bent section that is bent downward, the second bracket having a second bent section that is bent down, the pair of mounting seats forming a receiving space between the two first bent sections and the two second bent sections that receives a PCB supported and mounted thereon;

wherein the connection board forms a first adjustment hole corresponding to the first bracket and the second bracket, the first bracket having an end forming a first through hole corresponding to the first adjustment hole, the second bracket having an end forming a second through hole corresponding to the first adjustment hole, a first bolt extending through the first through hole and cooperating with the first adjustment hole to allow the first bracket and the connection board to be connected in such a way as being adjustable in a direction of the first adjustment hole, a second bolt extending through the second through hole and cooperating with the first adjustment hole to allow the second bracket and the connection board to be connected in such a way as being adjustable in the direction of the first adjustment hole.

2. The display device back panel with an adjustable PCB mounting seat as claimed in claim 1, wherein the body forms a first slide channel and a second slide channel respectively corresponding to the first bracket and the second bracket, the first slide channel and the second slide channel respectively forming a second adjustment hole and a third adjustment hole, the first bracket having an end forming a third through hole corresponding to the second adjustment hole, the second bracket having an end forming a fourth through hole corresponding to the third adjustment hole, a third bolt extending through the third through hole and cooperating with the second adjustment hole to allow the first bracket and the body to be connected in an adjustable manner in a direction of the second adjustment hole, a fourth bolt extending through the fourth through hole and cooperating with the third adjustment hole to allow the second bracket and the body to be connected in such a way as being adjustable in a direction of the third adjustment hole.

3. The display device back panel with an adjustable PCB mounting seat as claimed in claim 1, wherein the first bent section comprises a first positioning section that is vertically bent downwards, a bearing section that is perpendicular to an end of the first positioning section that is distant from the first bracket, and a first pawl section that is arranged at one side above the first bearing section and is inclined with respect to the first positioning section, the second bent section comprising a second positioning section that is vertically bent downwards, a second bearing section that is perpendicular to an end of the second positioning section that is distant from the second bracket, and a second pawl section that is arranged at one side above the second bearing section and is inclined with respect to the second positioning section, whereby to mount a PCB, the PCB is positioned on the two first bearing sections and the two second bearing sections and ends of the two first pawl sections and ends of the two second pawl sections being respectively in engagement with a surface of the PCB that is away from the first bearing sections and the second bearing sections.

4. The display device back panel with an adjustable PCB mounting seat as claimed in claim 1 further comprising a protection lid covering above the receiving space of the pair of mounting seats.

* * * * *